United States Patent
Aso

(10) Patent No.: US 8,705,109 B2
(45) Date of Patent: Apr. 22, 2014

(54) IMAGE FORMING APPARATUS AND IMAGE FORMING METHOD FOR CONTROLLING OBJECT RENDERING ORDER

(75) Inventor: Takamichi Aso, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 803 days.

(21) Appl. No.: 12/493,490

(22) Filed: Jun. 29, 2009

(65) Prior Publication Data

US 2010/0002256 A1  Jan. 7, 2010

(30) Foreign Application Priority Data

Jul. 3, 2008 (JP) ................................. 2008-174704

(51) Int. Cl.
*G06K 15/00* (2006.01)
(52) U.S. Cl.
USPC ......... 358/1.16; 358/1.15; 382/289; 382/297; 382/305
(58) Field of Classification Search
None
See application file for complete search history.

(56) References Cited

U.S. PATENT DOCUMENTS

| | | | | | |
|---|---|---|---|---|---|
| 6,148,119 | A | * | 11/2000 | Takaoka ...................... | 382/289 |
| 6,154,286 | A | * | 11/2000 | Konno et al. ................ | 358/1.13 |
| 6,314,213 | B1 | * | 11/2001 | Miyahara et al. ............ | 358/1.11 |
| 7,545,992 | B2 | | 6/2009 | Kato et al. | |
| 2002/0191865 | A1 | * | 12/2002 | Yamaguchi et al. .......... | 382/297 |
| 2004/0036894 | A1 | * | 2/2004 | Murata ........................ | 358/1.16 |
| 2004/0105114 | A1 | * | 6/2004 | Tomomatsu .................. | 358/1.13 |
| 2004/0218836 | A1 | * | 11/2004 | Kanatsu ....................... | 382/305 |
| 2005/0238244 | A1 | * | 10/2005 | Uzawa ......................... | 382/242 |
| 2005/0271296 | A1 | * | 12/2005 | Tsuji et al. ................... | 382/289 |
| 2005/0276519 | A1 | * | 12/2005 | Kitora et al. ................. | 382/305 |
| 2006/0007481 | A1 | | 1/2006 | Kato et al. .................... | 358/1.15 |
| 2006/0215233 | A1 | * | 9/2006 | Hirai et al. ................... | 358/448 |
| 2006/0288278 | A1 | * | 12/2006 | Kobayashi .................... | 715/523 |
| 2007/0058803 | A1 | * | 3/2007 | Suga ............................. | 380/30 |
| 2007/0109322 | A1 | * | 5/2007 | Miyata ........................ | 345/619 |
| 2008/0049259 | A1 | * | 2/2008 | Asano ......................... | 358/3.28 |
| 2008/0192280 | A1 | * | 8/2008 | Masuyama .................. | 358/1.13 |
| 2008/0256105 | A1 | * | 10/2008 | Nogawa et al. .............. | 707/101 |

FOREIGN PATENT DOCUMENTS

| | | |
|---|---|---|
| JP | 8-63345 | 3/1996 |
| JP | 11-331455 | 11/1999 |
| JP | 2000-032248 A | 1/2000 |
| JP | 2004-174756 A | 6/2004 |
| JP | 2006-23942 | 1/2006 |
| JP | 2006-023942 A | 1/2006 |
| JP | 2008-034973 A | 2/2008 |

OTHER PUBLICATIONS

Japanese Office Action issued on Jul. 17, 2012, in counterpart Japanese application No. 2008-174704.

* cited by examiner

*Primary Examiner* — Firmin Backer
*Assistant Examiner* — Nicholas Pachol
(74) *Attorney, Agent, or Firm* — Fitzpatrick, Cella, Harper & Scinto

(57) ABSTRACT

An object of the present invention is to provide an image forming apparatus and an image forming method by which image data are prepared for performing image processing at high speed and while saving memory. Vector data are generated from data scanned by a scanning unit. In this process, a printing direction is determined from a content input from an operating unit or information on an outputting device. If the printing direction and the scanning direction differ, control of an order of the data is performed to prepare a document after rotation.

4 Claims, 15 Drawing Sheets

IMAGE FORMING APPARATUS AND IMAGE FORMING METHOD FOR CONTROLLING OBJECT RENDERING ORDER

BACKGROUND OF THE INVENTION

1. Field of the Invention

The present invention relates to an image forming apparatus and an image forming method by which a process for changing a data structure in a document generated in accordance with a post-scan process is executed when generating vector data from scanned image data.

2. Description of the Related Art

An art of copying an image by inputting the image by an image input equipment connected to a network and outputting the image by another image output equipment connected to the network is disclosed in Japanese Patent Laid-Open No. H11-331455(1999). Such a function of performing copying by image input and image output by different equipments on a network is called remote copying.

Further, an art of improving productivity of an image data output process by synchronously outputting image data to a plurality of image processing apparatuses is disclosed in Japanese Patent Laid-Open No. H08-63345(1996).

Further, an art of converting a bitmap image, input by an image input apparatus, to drawing data that are not dependent on a resolution of the image input apparatus is disclosed in Japanese Patent Laid-Open No. 2006-23942. Such a process of converting a bitmap image to data that are not dependent on resolution is called vectorization or vectorizing, and data obtained as a result of vectorization are called vector data.

By using these arts, an input image can be converted to vector data that do not depend on resolution and can be transferred to another image output equipment across a network.

By then converting (rasterizing) the received vector data back to a bitmap image at the image output equipment side, a process of resolution conversion of the bitmap image is eliminated and image degradation due to the resolution conversion process can be prevented.

Thus, by combining these arts, high-definition remote copying can be realized for any image output apparatus on a network.

In generating vector data by vectorizing a scanned image, the vector data are generated according to a scanning direction. Here, in printing an image from the vector data by an equipment, if a printing direction differs from the scanning direction, the printing must be performed after rotating the bitmap data generated from the vector data. There is thus a problem that when a device is low in CPU performance or memory access speed, the rotation process takes much time. There is also a problem that when the vector data are rasterized to the bitmap data to perform printing, a large size of memory is required because the rotation process must be performed after expanding all of the data in the memory.

An object of the present invention is to provide an image forming apparatus and an image forming method by which image data are prepared for performing image processing at high speed and while saving memory.

SUMMARY OF THE INVENTION

An image forming apparatus according to the present invention includes: a unit for inputting image data acquired by scanning a manuscript (an original image); a unit for dividing the input image data into a plurality of objects; a unit for judging a printing direction for printing the input image data; a unit for determining a printing order of each divided object to be in a sequence suited to the printing direction when a direction of the scanning of the manuscript differs from the judged printing direction; a unit for converting the objects to resolution-independent data that do not depend on a resolution in inputting; and a memory unit for memorizing information on the determined printing order in association with each object that has been converted.

According to the present invention, an image forming apparatus and an image forming method by which image data are prepared for performing image processing at high speed and while saving memory can be provided.

Further features of the present invention will become apparent from the following description of exemplary embodiments (with reference to the attached drawings).

BRIEF DESCRIPTION OF THE DRAWINGS

FIG. 12 is a diagram showing the relationship of FIGS. 12A and 12B;

DESCRIPTION OF THE EMBODIMENTS

Best modes for performing the present invention shall now be described with reference to the drawings. However, configurations described in the embodiments are mere examples and are not intended to restrict the scope of the present invention thereto.

Embodiment 1

A first embodiment shall now be described.

<Configuration Example of an Image Forming Apparatus>

A configuration example of an image forming apparatus according to the present embodiment shall now be described with reference to FIGS. 1 and 2.

Figure 1:
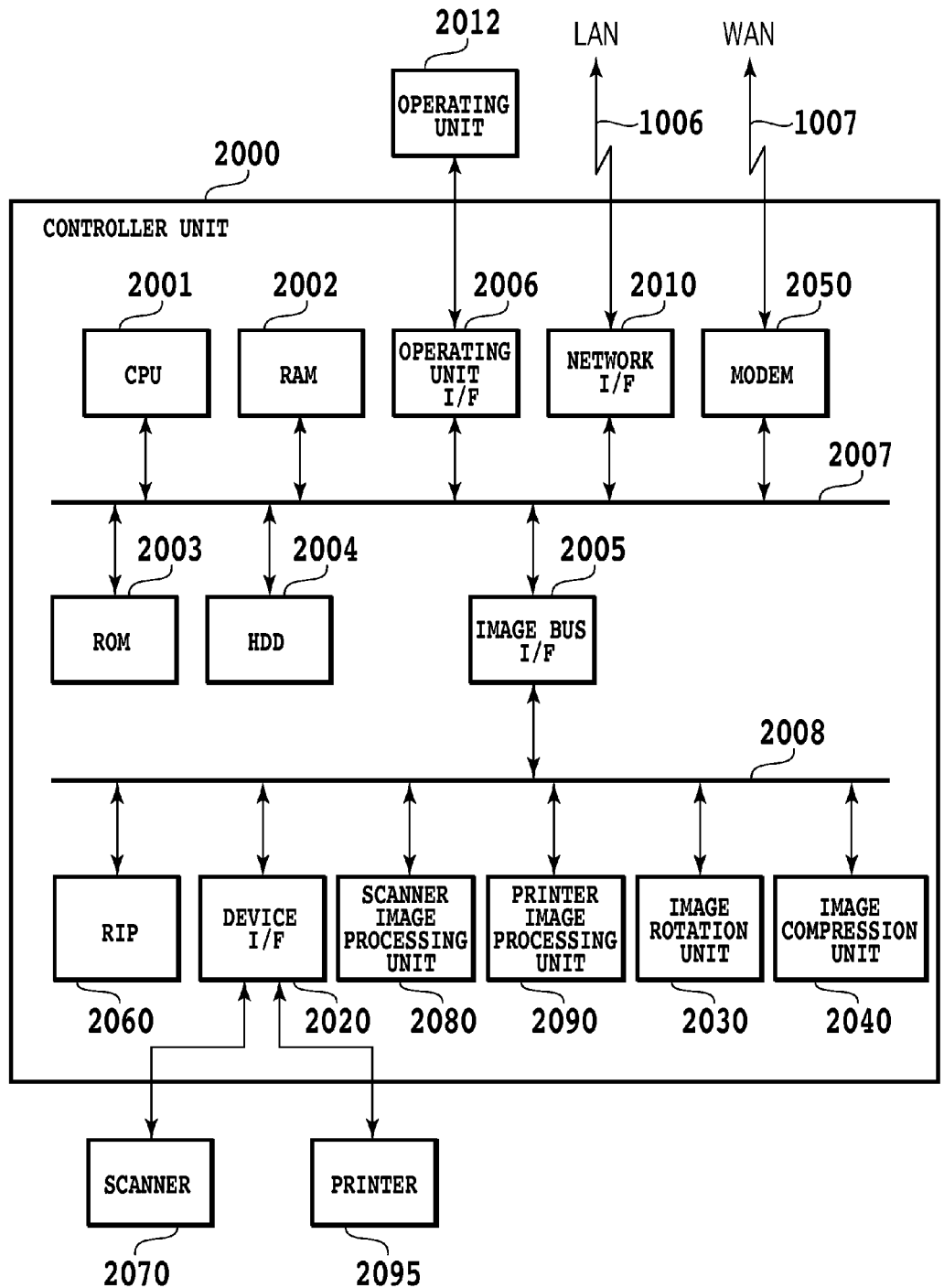
FIG. 1 is a block diagram illustrating a configuration of principal portions of a MFP (Multifunction Peripheral) according to an embodiment of the present invention.

FIG. 1 is a block diagram illustrating a configuration of principal portions of a MFP(Multifunction Peripheral) that is the image forming apparatus according to the present embodiment. A controller unit 2000 is connected to a scanner 2070 which is an image input device, and to a printer 2095 which is an image output device, and performs control for realizing a copy function whereby image data read by the scanner 2070 are output by printing by the printer 2095. Moreover, the controller unit 2000 performs control for performing input and output of image information and device information via networks, such as a LAN 1006 and a public line 1007 (WAN), which are connected thereto.

Specifically, the controller unit 2000 includes a CPU 2001. The CPU 2001 starts up an operation system (OS) by a boot program stored in a ROM 2003. Further, the CPU 2001 executes various processes on the OS by executing application programs stored in an HDD (hard disk drive) 2004. A RAM 2002 is used as a working area of the CPU 2001. The RAM 2002 provides the working area as well as an image memory area for temporarily memorizing image data. The HDD 2004 stores image data as well as the application programs.

The CPU 2001 is connected via a system bus 2007 to the ROM 2003 and the RAM 2002 as well as to an operating unit I/F (interface) 2006, a network I/F 2010, a modem 2050, and an image bus I/F 2005.

The operating unit I/F 2006 is an interface to an operating unit 2012, which includes a touch panel, operating keys, etc., and outputs, to the operating unit 2012, image data to be displayed on the operating unit 2012. The operating unit I/F 2006 sends to the CPU 2001 information input by a user at the operating unit 2012.

The network I/F 2010 is connected to the LAN 1006 and performs input and output of information from and to respective apparatuses on the LAN 1006 via the LAN 1006. The modem 2050 is connected to the public line 1007 and performs input and output of information via the public line 1007.

The image bus I/F 2005 connects the system bus 2007 and an image bus 2008. The image bus I/F 2005 is a bus bridge for high-speed transmission of image data and data structure conversion. The image bus 2008 consists of a PCI bus or IEEE 1394, etc.

A raster image processor (RIP) 2060, a device I/F 2020, a scanner image processing unit 2080, a printer image processing unit 2090, an image rotation unit 2030, a thumbnail preparation unit 2035, and an image compression unit 2040 are disposed on the image bus 2008. The RIP 2060 is a processor that expands PDL codes to a bitmap image. The device I/F 2020 is connected to the scanner 2070 and the printer 2095, and the device I/F 2020 performs synchronous system/asynchronous system conversion of image data. The scanner image processing unit 2080 performs correction, processing, and editing of input image data. The printer image processing unit 2090 performs printer correction, resolution conversion, etc., on printing output image data. The image rotation unit 2030 performs rotation of image data. The image compression unit 2040 performs compression of multivalued image data to JPEG data, compression of binary image data to JBIG, MMR, MH, or other data, and also performs expansion processing of data.

Figure 2:
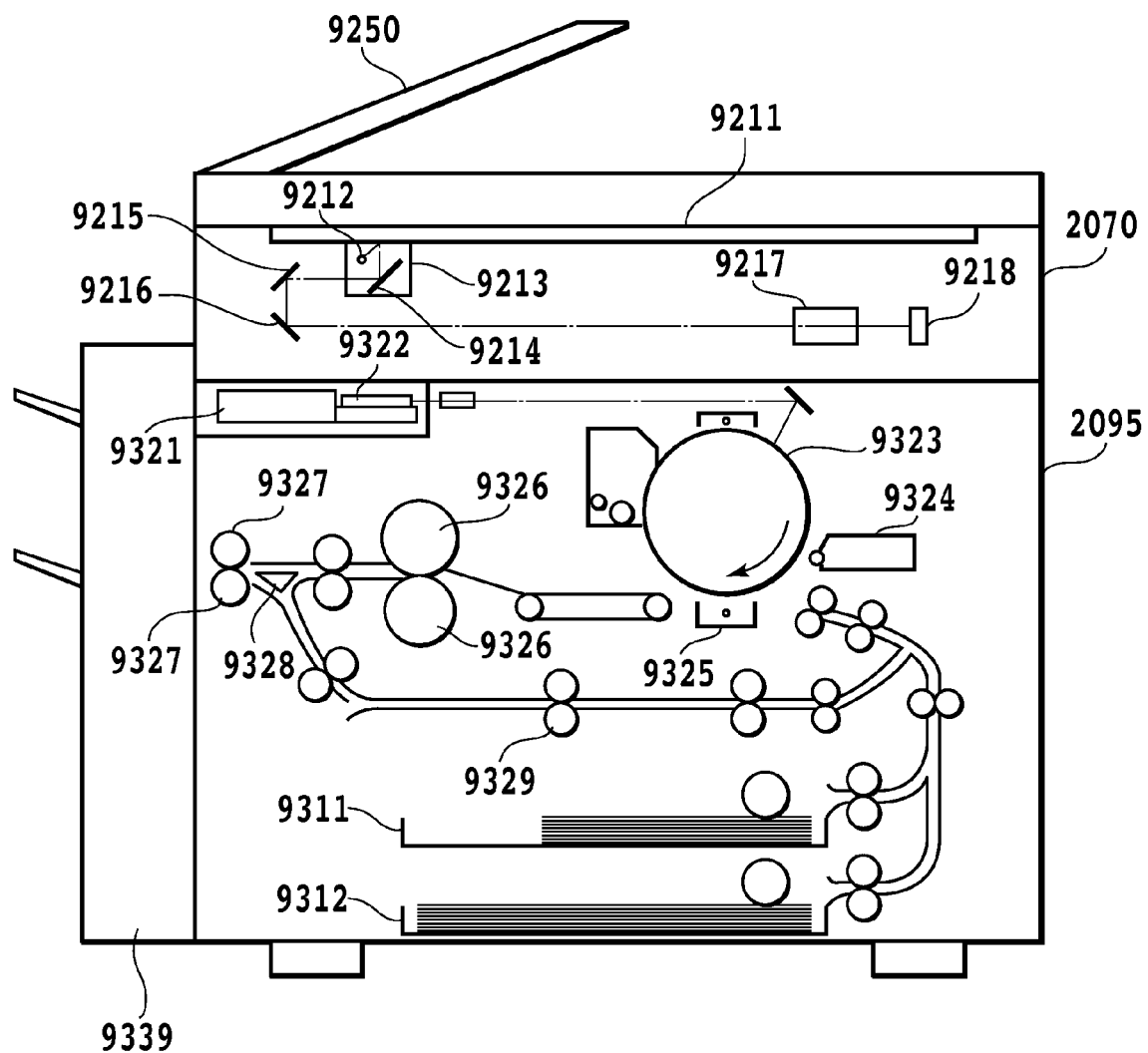
FIG. 2 is a schematic diagram illustrating a hardware configuration of the MFP of FIG. 1.

FIG. 2 is a schematic diagram illustrating a hardware configuration of the scanner unit 2070 and the printer unit 2095 of the MFP shown in FIG. 1.

As shown in FIG. 2, the scanner unit 2070 and the printer unit 2095 are configured integrally. The scanner unit 2070 has a manuscript feeding unit 9250, and the manuscript feeding unit 9250 feeds manuscripts, one sheet at a time from the beginning, onto a platen glass 9211. Each time a reading operation of a manuscript ends, the manuscript is discharged from the platen glass 9211 onto a discharge tray (not shown). The scanner unit 2070 turns on a lamp 9212 and starts movement of a moving unit 9213 when the manuscript is fed onto the platen glass 9211.

By the movement of the moving unit 9213, a reading scan of the manuscript on the platen glass 9211 is performed. During the reading scan, reflected light from the manuscript is guided via respective mirrors 9214, 9215, and 9216 and a lens 9217 to a CCD image sensor (hereinafter referred to as "CCD") 9218 and an image of the manuscript is formed on an image pickup surface of the CCD 9218. The CCD 9218 converts the image formed on the image pickup surface to an electric signal and the electric signal is input into the controller unit 2000 (see FIG. 1) after being subject to a predetermined process.

The printer unit 2095 includes a laser driver 9321, and the laser driver 9321 drives a laser emitting unit 9322 based on image data input from the controller unit 2000. Laser light in accordance with the image data is thereby emitted from the laser emitting unit 9322, and the laser light which is being scanned is illuminated on a photoconductor drum 9323. An electrostatic latent image is formed on the photoconductor drum 9323 by the illuminated laser light, and the electrostatic latent image is visualized as a toner image by a toner supplied from a developer unit 9324. In synchronization with the illumination timing of the laser light, a recording sheet is fed between the photoconductor drum 9323 and a transfer unit 9325 from a cassette 9311 or 9312 and via a conveying path, and the toner image on the photoconductor drum 9323 is transferred onto the recording sheet fed by the transfer unit 9325.

The recording sheet onto which the toner image has been transferred is fed via a conveyor belt to a fixing roller pair (a heating roller and a pressing roller) 9326 and the fixing roller pair 9326 hot press the recording sheet and make the toner image on the recording sheet become fixed onto the recording sheet. The recording sheet that has passed through the fixing roller pair 9326 is discharged by a sheet discharging roller pair 9327 onto a sheet discharging unit 9330. The sheet discharging unit 9330 includes a sheet processing apparatus capable of performing post processing such as sorting and stapling. When a two-sided recording mode is set, the recording sheet is conveyed to the sheet discharging roller pair 9327 and then a rotation direction of the sheet discharging roller pair 9327 is reversed and the recording sheet is guided to a sheet re-feeding conveying path 9339 by a flapper 9328. The recording sheet that has been guided to the sheet re-feeding conveying path 9339 is re-fed between the photoconductor drum 9323 and the transfer unit 9325 according to the above described timing and a toner image is transferred onto a rear surface of the recording sheet.

<Data Processing by the Controller Unit>

It shall now be described how vector data and metadata that make up a document are generated at the controller unit 2000 when the MFP (image forming apparatus) performs copying or other image forming process.

Figure 3:
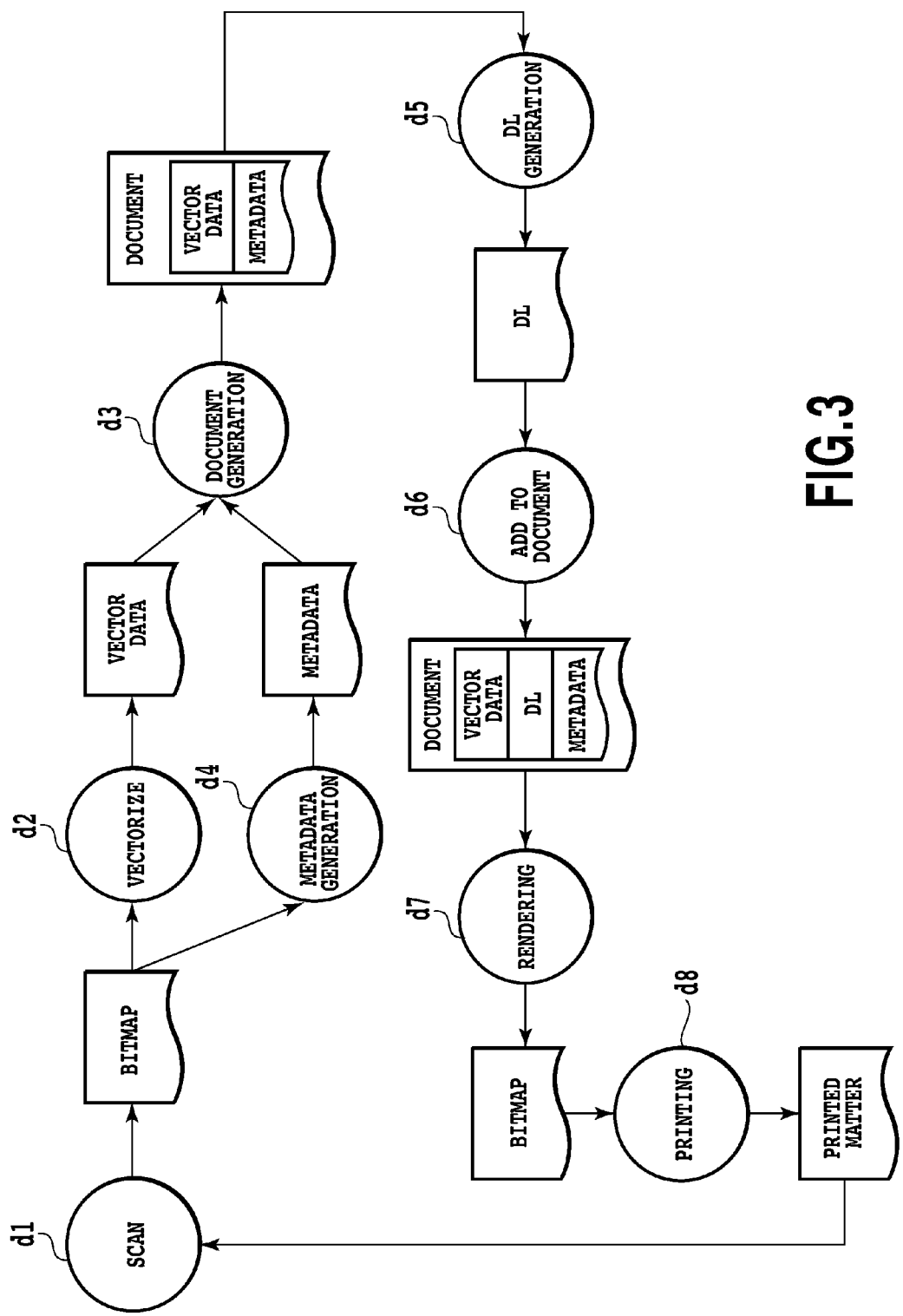
FIG. 3 is a diagram illustrating data flow in scanning and copying in the embodiment of the present invention.

FIG. 3 is a diagram illustrating an example of data flow during a copying operation. The process control is performed by the CPU 2001, provided in the controller unit 2000, expanding a program, memorized in the HDD 2004, etc., in the RAM 2002 and executing the program.

First, in a scanning process d1, a paper manuscript, set on a manuscript exposing unit (on the platen glass 9211), is converted to bitmap data by the scanner unit 2070 in accordance with a command sent from the controller unit 2000.

Then, by a vectorizing process d2 and a metadata generating process d4, the bitmap data are sent from the scanner unit 2070 to the controller unit 2000. Then, in the controller unit 2000, vector data which do not depend on resolution, and metadata accompanying thereto are respectively generated from the bitmap data. A specific method for generating the vector data and the metadata shall be described below.

Next, in a document generating process d3, a document, in which the vector data and the metadata are associated, is generated.

Next, in a DL generating process d5, a DL (display list) is generated from the vector data in the document. The generated DL is thereafter stored inside the document (d6).

Then, the document is expanded to a bitmap by a rendering process d7.

The expanded bitmap is recorded by a printing process d8 onto a paper medium and becomes printed matter. By setting the output printed matter on the manuscript exposure unit again, the processes from the scanning process d1 onward can be performed.

<Document Data Structure>

A structure of the document generated by the process shown in FIG. 3 shall now be described.

Figure 4:
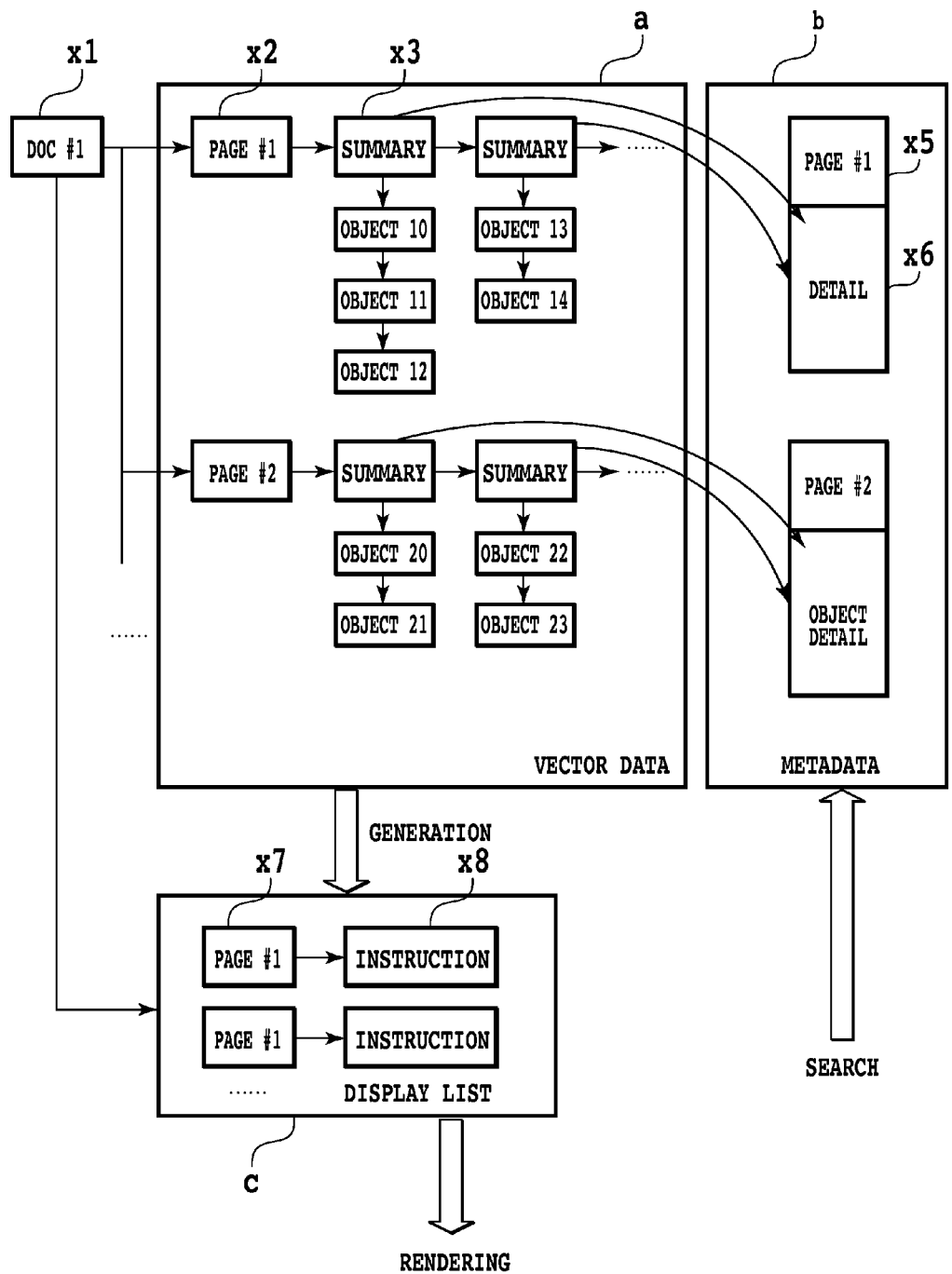
FIG. 4 is a diagram illustrating a data structure of a document in the embodiment of the present invention.

FIG. 4 is a diagram illustrating an example of the data structure of the document. The document is data made up of a plurality of pages and includes, as principal data structures, a document header (x1), the vector data (a), the metadata (b), and the DL (c). The data structure of the document is a hierarchical structure headed by the document header (x1).

The vector data (a) further include page headers (x2), summary information (x3), and objects (x4). The metadata (b) further include page information (x5) and detailed information (x6). The DL (c) further includes page headers (x7) and drawing expansion instructions (x8). A storage location of the vector data and a storage location of the DL are described in the document header (1), and the vector data and the DL are thereby associated with each other.

The vector data (a) are resolution-independent drawing data, and layout information, such as a size and a direction of a page, etc., is described in the page header (x2). Objects (x4) are linked one-by-one to drawing data, such as a line, a polygon, a Bezier curve, etc., and a plurality of objects is associated collectively with the summary information (x3). The summary information (x3) expresses the characteristics of the plurality of objects collectively and includes a description of attribute information of a divided region, etc.

The metadata (b) are added information for searching and are not relevant to a drawing process. For example, the page information (x5) area includes a description of such page information as whether the metadata were generated from bitmap data or from PDL data, etc. The detailed information (x6) includes a description, for example, of a character string (character code string) that is generated as OCR information or image information. Metadata are referenced from the summary information (x3) of the vector data (a), and the detailed information (x6) can be found from the summary information (x3).

The DL (c) is an intermediate code for performing bitmap expansion of the vector data (a) by a renderer. Each page header (x7) includes a management table of drawing information (instruction) within a page, etc., and each instruction (x8) is made up of resolution-dependent drawing information.

Figure 5:
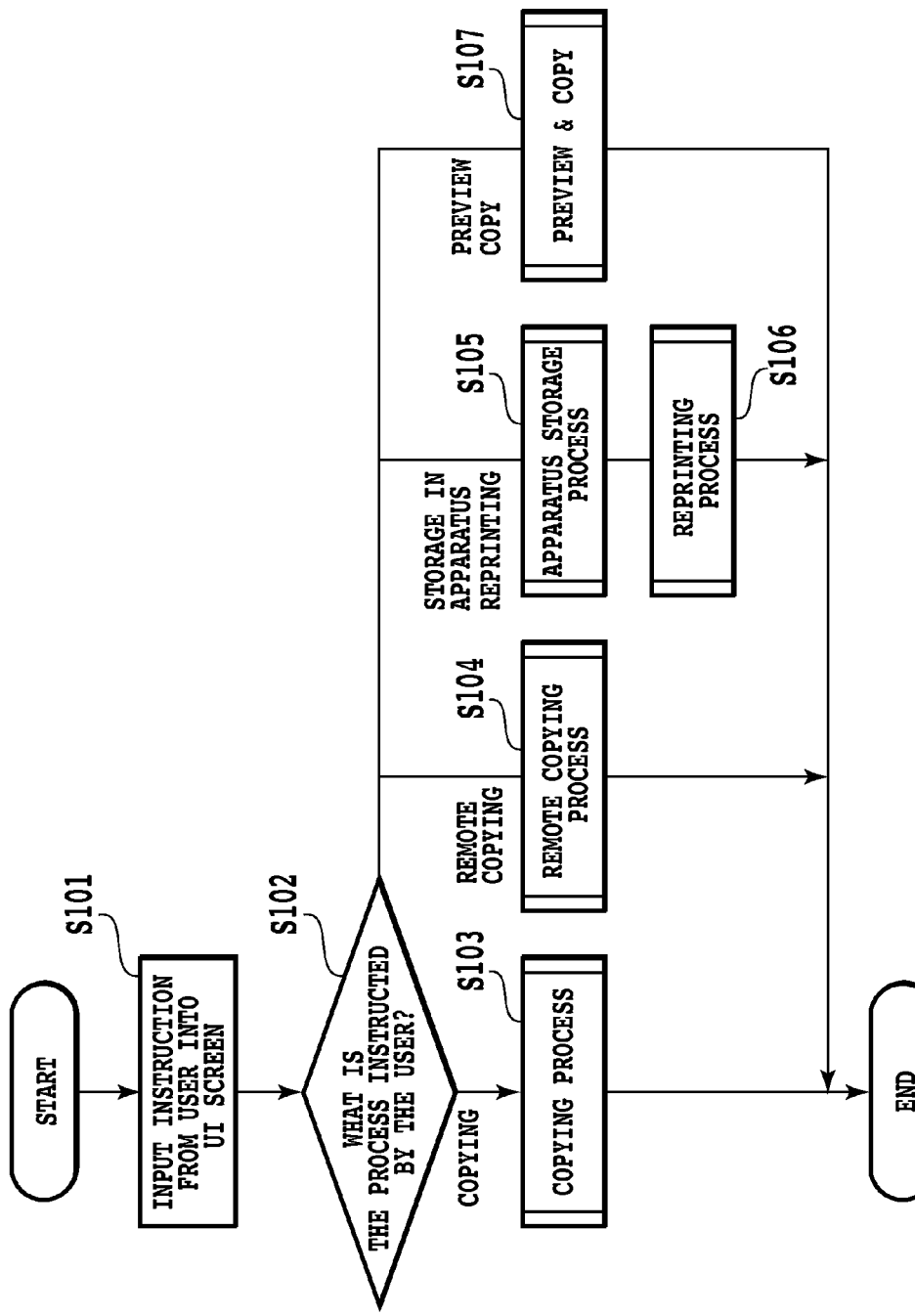
FIG. 5 is a flowchart illustrating an overall processing procedure in Embodiment of the present invention.

FIG. 5 is a flowchart illustrating an overall processing procedure performed in the image forming apparatus according to the present embodiment. Process control is performed by the CPU 2001, provided in the controller unit 2000, expanding a program, memorized in the HDD 2004, etc., in the RAM 2002 and executing the program.

First in step S101, instruction content information input via the operating unit 2012 from a user is sent to the controller unit 2000. That is, the controller unit 2000 receives the instruction information from the user.

In step S102, the controller unit 2000 switches to a process by a document generating method to be carried out subsequently based on the received instruction information. For example, the process is switched to copying, remote copying, storing in an equipment, previewing, etc. The respective processes are performed in steps S103, S104, S105, S106, and S107. Details of the processes of steps S103 to S107 shall now be described with reference to FIGS. 6 to 12.

Figure 6:
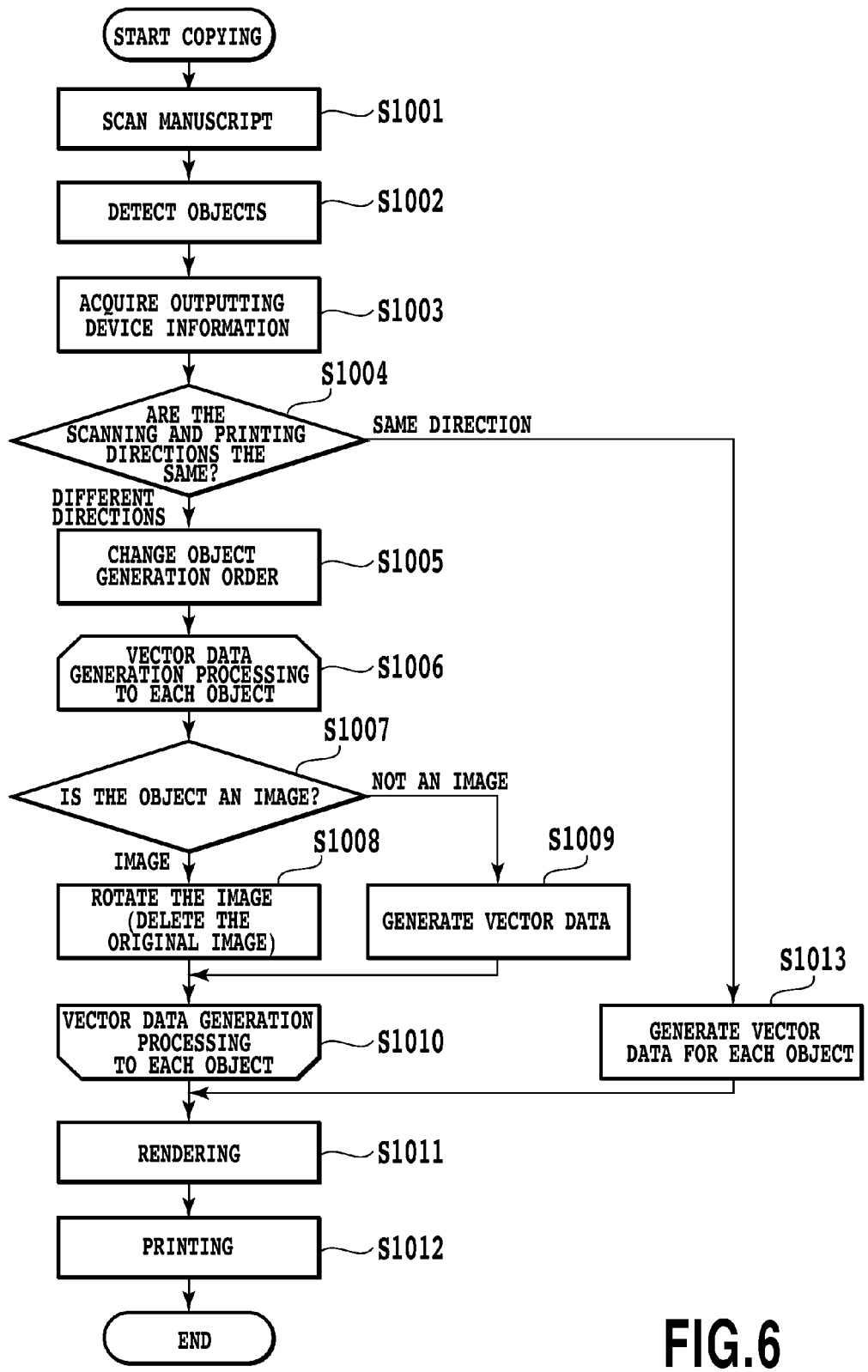
FIG. 6 is a flowchart illustrating a processing procedure for copying in Embodiment 1 of the present invention.

FIG. 6 is a flowchart illustrating a processing procedure for the copying process (S103) in the present embodiment. Process control is performed by the CPU 2001, provided in the controller unit 2000, expanding a process program shown in FIG. 6, memorized in the HDD 2004, etc., in the RAM 2002 and executing the program.

In step S1001, the CPU 2001 sends a command to the scanner unit 207 to make the scanner unit 2070 scan a manuscript from a predetermined direction. The CPU 2001 makes the RAM 2002 or other memory unit memorize scanning direction information that indicates the scanning direction. The CPU 2001 then generates bitmap data from the data obtained by the scanning. That is, image data scanned from the manuscript are input into the image forming apparatus.

The scanning direction of the above described scanner unit 2070 may be set in advance in the image forming apparatus or the user may set a desired direction via the operating unit 2012. The scanning direction is one of either a longitudinal direction or a lateral direction with respect to the manuscript (sheet) that is scanned.

In step S1002, the CPU 2001 detects objects, such as texts, images (illustrations and other images), lines, graphics, tables, etc., from the bitmap data generated by step S1001. An image region expressed by the bitmap is then divided according to each object. Further, coordinates of each divided object are acquired to generate position information of each object. Here, the detection of the objects from the bitmap data and the division according to the objects may be performed by any method, and in the present embodiment, these are performed by known methods.

In step S1003, the CPU 2001 acquires, from the printer unit 2095 or the HDD 2004, etc., information concerning device capabilities in printing, such as whether a direction in which printing output can be performed (printing direction) is longitudinal or lateral, what types of sheets are placed in sheet feeding stages, etc. A direction in which output must be performed during printing is then judged according to the device capabilities. For example, in a case where a sheet conveying direction is restricted to the lateral direction as in a compact machine, the printing direction is the lateral direction. Even in a case where conveying in either direction is enabled, if there are A4-size and A4R-size sheet feeding stages and A4R-size sheets have run out, the printing direction is set to the longitudinal direction. The printing direction judgment result is memorized as printing direction information in the RAM 2002, HDD 2004, or other memory unit. Although in the present embodiment, the printing direction is judged based on the device capabilities, this judgment is not restricted to this method. For example, the printing direction may instead be judged according to an operation input performed by a user via an operating unit (operating unit 2012) equipped in the image forming apparatus.

In step S1004, the CPU 2001 judges whether or not the sheet (manuscript) direction during scanning (scanning direction) and the sheet direction during printing (printing direction) are the same based on the scanning direction information and the printing direction information memorized in the RAM 2002 or other memory unit. That is, information concerning the scanning direction is acquired after scanning of the manuscript, and it is judged whether or not this scanning direction and the printing direction, judged in step S1003, are the same. If the scanning and printing directions are the same, the process continues to step S1013, and then vector data are generated according to each object.

In a case where the scanning and printing directions differ, the process continues to step S1005, and an object generation order (that is, the order in which each object is rendered or output by printing) is determined to be in a sequence suited to the printing direction. The object generation order shall be described later using an example shown in FIG. 7. The determined object generation order information is included in the document in association with each object and memorized in the RAM 2002 or other memory unit.

Step S1006 to step S1010 is a process of generating vector data according to each divided object detected in step S1002. The vector data are resolution-independent data that enable an image, input by scanning, to be output at an image quality that does not depend on the input resolution.

In step S1007, it is judged whether a type of an object is an image (illustration, etc.) or another type (text, table, etc.). This judgment may be made by any method and is made by a known method in the present embodiment. If the object type is other than an image, S1009 is entered and the vector data of the object are generated.

In the case of an image, the process continues to S1008 and the image (object) is expanded in the RAM 2002 and an image rotation process is performed.

Figure 8:
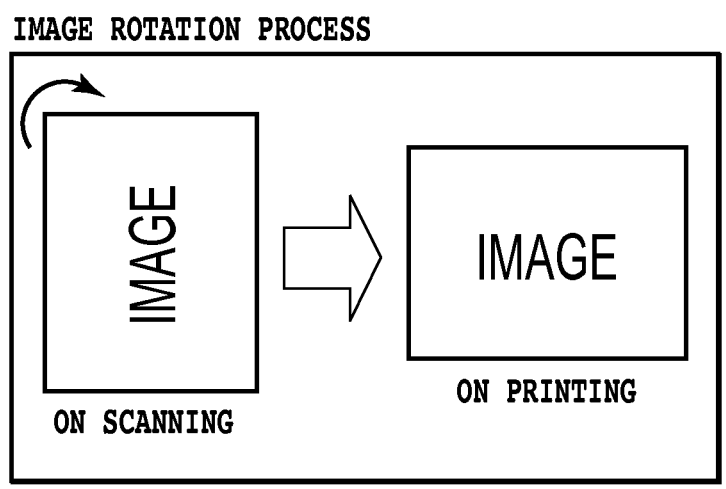
FIG. 8 is a diagram illustrating an image rotation process in Embodiment 1 of the present invention.

A concept of image rotation process is shown in FIG. 8. A scanned object unit image is rotated (for example, by 90 degrees) about its center as an axis so that the direction of the object is suited to the printing direction during printing. At this point, manuscript layout information for printing is prepared based on the layout information generated in step S1002. Further, because the image before rotation that has been expanded in the RAM 2002 is not used in the printing process, the image is deleted from the RAM 2002.

The images before being subject to the rotation process are thus successively deleted in units of objects from the RAM 2002, beginning with those for which the rotation process has ended. The memory capacity necessary for executing the image rotation process can thus be reduced and further as a result, the processing speed can be improved.

After step S1008 or S1009 in FIG. 6, the processing according to each object is ended in step S1010 and step S1011 is entered. In step S1011, with regard to CPU 2001, a rendering process is performed on the document containing the objects, etc., on which the above-described processes have been applied. In the rendering process, resolution conversion, color processing, etc., are performed and bitmap data are generated. The rendering process on the objects is performed in the object generation order determined in step S1005. In step S1012, printing of the prepared bitmap data is performed and the process is ended.

Figure 7:
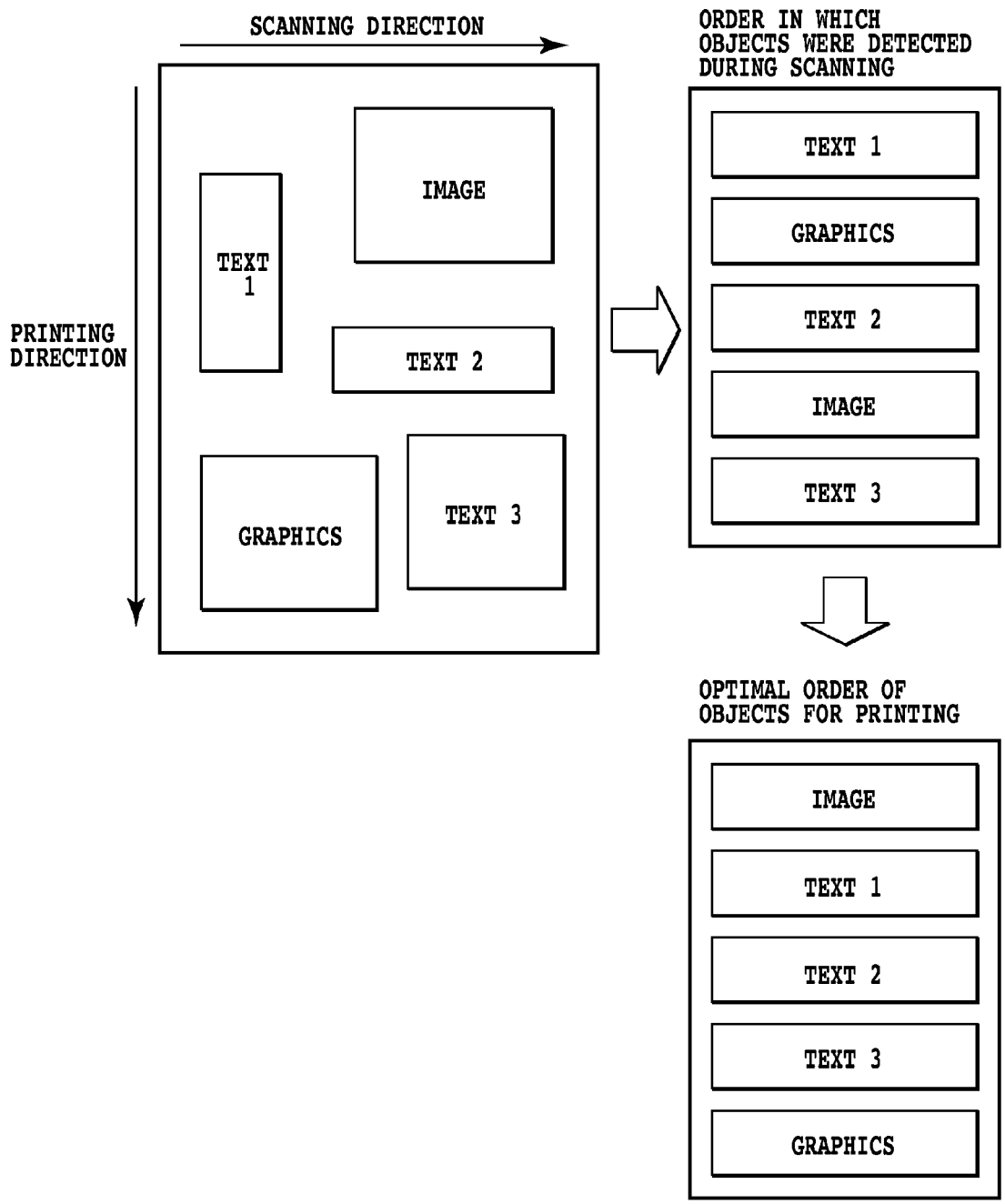
FIG. 7 is a diagram illustrating an example of changing an object generation order in Embodiment 1 of the present invention.

FIG. 7 is a conceptual diagram illustrating an example of a process of changing the object generation order. In this example, the scanning direction is the lateral direction and the printing direction is the longitudinal direction. In this case, because the scanning direction is the lateral direction, the order of the objects detected during scanning is: TEXT 1; GRAPHIC; TEXT 2; IMAGE; AND TEXT 3. However, because the printing direction is the longitudinal direction, if during printing, rendering is performed in the same direction as scanning, the printing speed becomes slow because the printing process cannot be performed until all of the rendering process is completed. It also becomes difficult to reduce the amount of memory used because all of the rendered data must be held.

However, with the process shown in FIG. 6, the object generation order that is optimal for printing is determined as the object generation order information in step S1005 before the rendering process in step S1011 and the rendering process is performed using the order information. Thus, even if the scanning direction and the printing direction differ, the printing process can be performed successively on the objects on which the rendering process has ended (step S1012). Therefore, the printing process thus does not have to be started after waiting for completion of all of the rendering process, and the printing speed can be improved. Furthermore, by successively deleting the data from the memory, among the rendered data, for which the printing process has ended, the need to hold the entirety of the rendered data at the same time in the memory is eliminated and the memory usage amount necessary for the process can be reduced. Further, because the image that is divided according to the objects is vectorized, the processing speed can be improved and the memory usage amount can be reduced while preventing degradation of the image.

As described above, according to the present embodiment, image data can be prepared for performing image processing at high speed and while saving memory.

Figure 9:
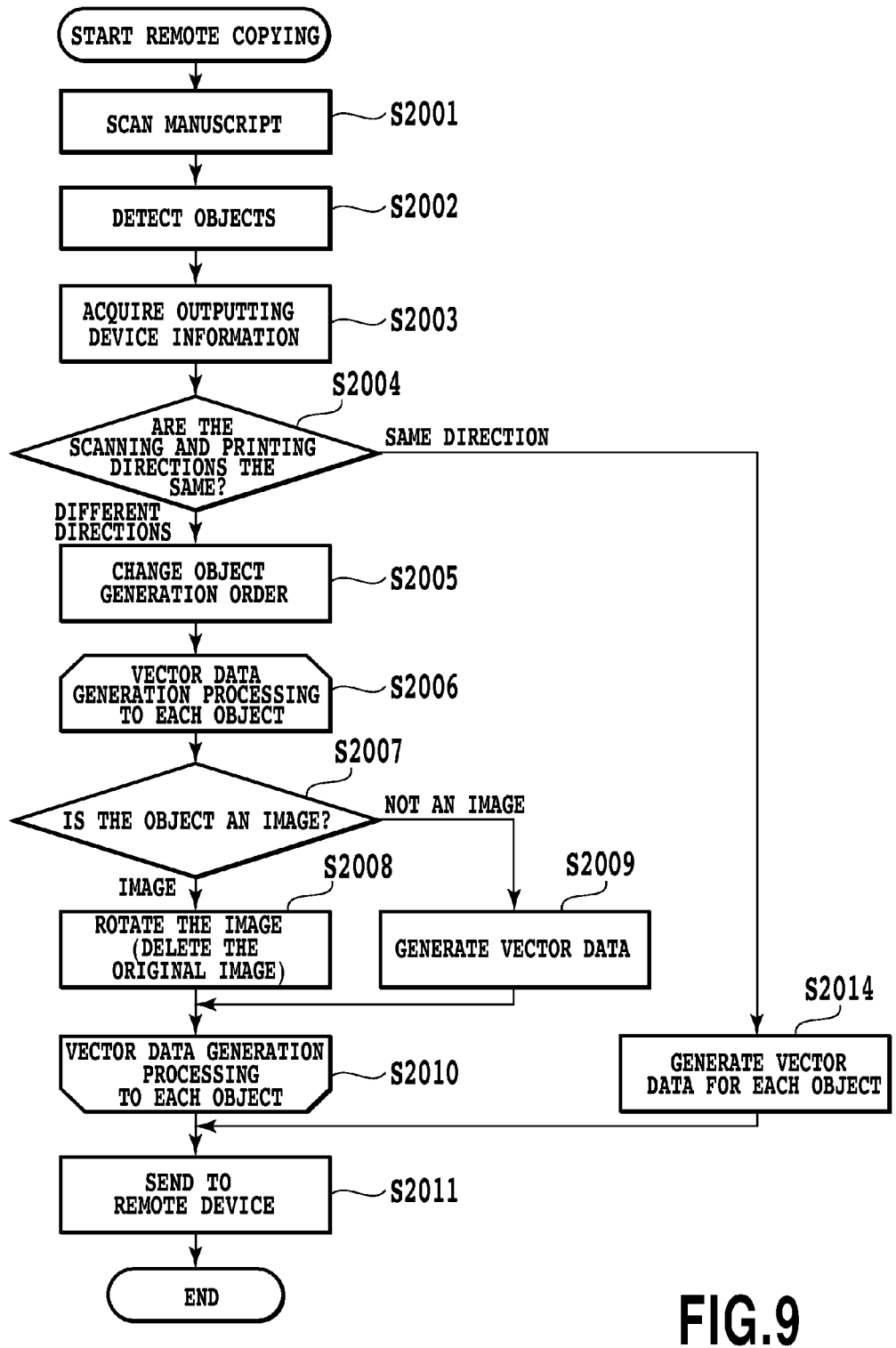
FIG. 9 is a flowchart illustrating a processing procedure for remote copying in Embodiment 1 of the present invention.

FIG. 9 is a flowchart illustrating a procedure for a remote copying process in the present embodiment (step S104 in FIG. 5). Process control is performed by the CPU 2001, provided in the controller unit 2000, expanding a program, memorized in the HDD 2004, etc., in the RAM 2002 and executing the program.

In step S2001, the CPU 2001 sends the command to the scanner unit 2070 to make the scanner unit 2070 scan the manuscript in the predetermined scan direction. The scanning direction information that indicates the scanning direction is memorized in the RAM 2002 or other memory unit. The image obtained by scanning is generated as the bitmap data in the controller unit 2000. That is, the image data scanned from the manuscript are input into the image forming apparatus.

In step S2002, first, objects, such as texts, images, lines, graphics, tables, etc., are detected from the bitmap generated at the controller unit 2000. The image region expressed by the bitmap is then divided according to each object detected. Further, the layout information of manuscript (the information including the position information of the objects in the manuscript) is generated. Here, the detection of the objects from the bitmap and the division of the bitmap according to the objects may be performed by any method, and in the present embodiment, these are performed by known methods.

In step S2003, the information concerning the device capabilities during printing, such as whether the direction in which printing output can be performed is longitudinal or lateral, what types of sheet are placed in the sheet feeding stages, etc., are acquired. The direction in which output must be performed during printing is then judged according to the device capabilities. For example, in the case where the sheet conveying direction is restricted to the lateral direction as in a compact machine, the printing direction is the lateral direction. Even in the case where conveying in either direction is enabled, if there are A4-size and A4R-size sheet feeding stages and the A4R-size sheets have run out, the printing direction is set to the longitudinal direction. The printing direction judgment result is memorized as the printing direction information in the RAM 2002, HDD 2004, or other memory unit.

In step S2004, whether or not the sheet (manuscript) direction during scanning and the sheet direction during printing are the same is judged. That is, the information concerning the scanning direction is acquired after scanning of the manuscript, and it is judged whether or not this scanning direction and the printing direction, judged in step S2003, are the same. If the scanning and printing directions are the same, step S2014 is entered and the vector data are generated according to each object.

In a case where the scanning and printing directions differ, step S2005 is entered, and the object generation order (that is, the order in which the objects are rendered or output by printing) is determined to be in the sequence suited to the printing direction. The determined object generation order information is included in the document in association with each object and memorized in the RAM 2002 or other memory unit.

Step S2006 to step S2010 is the process of generating the vector data according to each divided object detected in step S2002. The vector data are resolution-independent data that enable the image, input by scanning, to be output at an image quality that does not depend on the input resolution.

In step S2007, it is judged whether the type of an object is an image or another type. This judgment may be made by any method and is made by a known method in the present embodiment. If the object type is other than an image, S2009 is entered and the vector data of the object are generated.

In the case of an image, S2008 is entered and the image (object) is expanded in the RAM 2002 and the image rotation process such as shown in FIG. 8 is performed.

Now, the manuscript layout information for printing is prepared based on the layout information generated in step S2002. Further, because the image before rotation that has been expanded in the RAM 2002 is not used in the printing process, the image is deleted from the RAM 2002.

Described above, the images before being subject to the rotation process are thus successively deleted in object units from the RAM 2002, beginning with those for which the rotation process has ended. The memory capacity necessary for executing the image rotation process can thus be reduced and further as a result, the processing speed can be improved.

After step S2008 or S2009 in FIG. 9, the processing for each object is ended in step S2010 and S2011 is entered.

In step S2011, data, including the objects on which the above-described processes have been applied, the object generation order information, the layout information, etc., are sent as a document to a remote device and the process is ended. Thereafter, the rendering process and the printing process are performed on the received document at the remote device.

Figure 10:
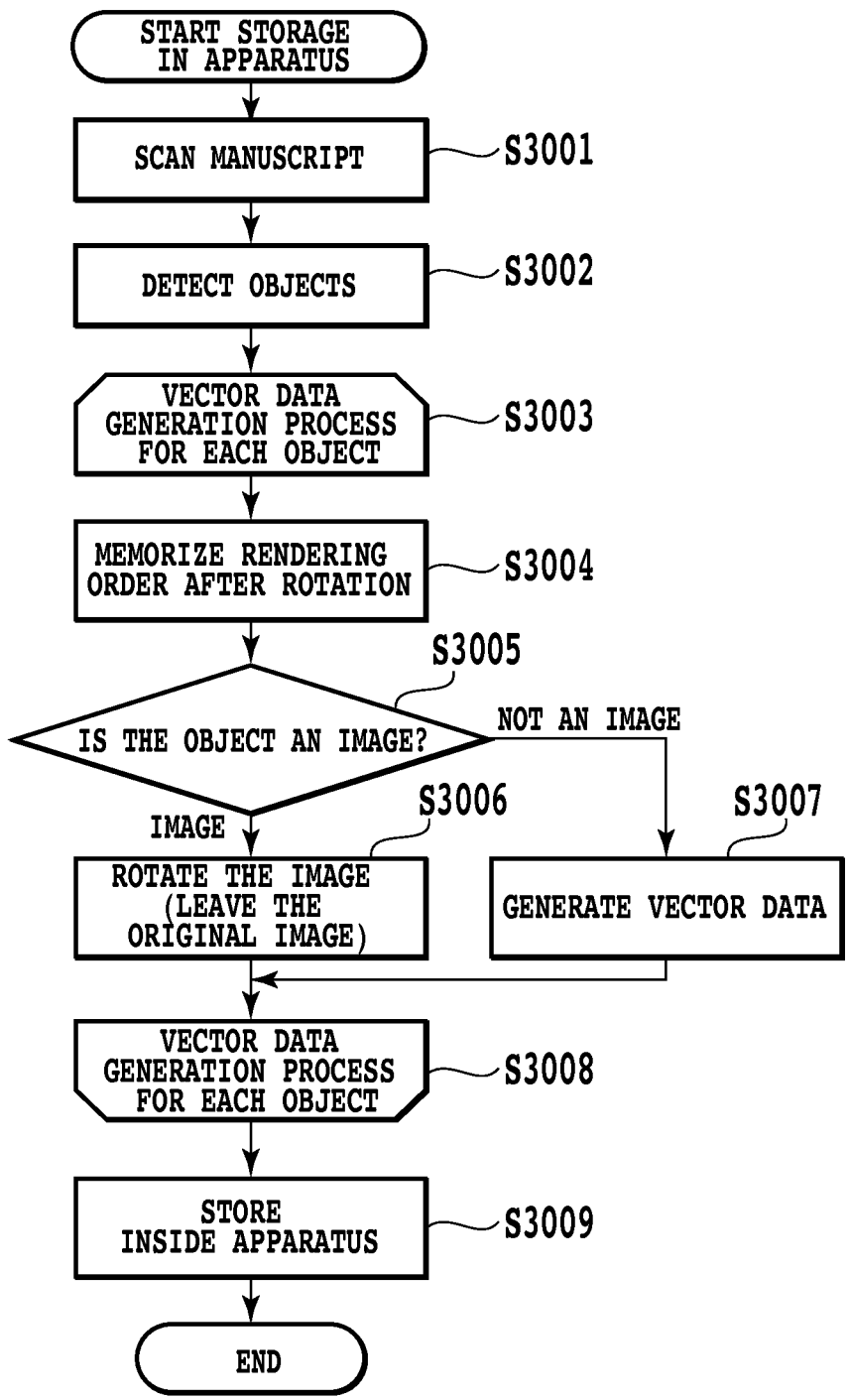
FIG. 10 is a flowchart illustrating a processing procedure for storing a document in an equipment in Embodiment 1 of the present invention.

FIG. 10 is a flowchart illustrating a procedure for a process of storage (step S105 in FIG. 5) of a document in an equipment in the present embodiment. In a case where a document is stored in an equipment, processes such as printing, previewing, sending to another equipment, etc. can be selected as post-storage processes. Thus, in the present process, a document that accommodates for both a case of not rotating and a case of rotating is prepared and stored to accommodate for the post-storage processes. Process control is performed by the CPU 2001, provided in the controller unit 2000, expanding a program, memorized in the HDD 2004, etc., in the RAM 2002 and executing the program.

In step S3001, scanning of the manuscript from a certain direction is performed by the scanner unit 2070 in accordance with control by the controller unit 2000, and the image obtained by scanning is generated as the bitmap data in the controller unit 2000. That is, the image data scanned from the manuscript are input into the image forming apparatus.

In step S3002, first, objects, such as texts, images, lines, graphics, tables, etc., are detected from the bitmap generated at the controller unit 2000. The image region expressed by the bitmap is then divided according to each object detected. Further, the layout information of manuscript (the information including the position information of the objects in the manuscript) is generated. Here, the detection of the objects from the bitmap and the division of the bitmap according to the objects may be performed by any method, and in the present embodiment, these are performed by known methods.

Step S3003 to step S3008 is the process of generating vector data according to each object.

In step S3004, a rendering order of an object in the case where the printing process is performed after performing the rotation process on images is determined. The object rendering order information is determined according to the sequence suited to the printing direction (that is, the sequence in which printing is performed) and is memorized in the RAM 2002 or other memory unit upon being associated with each object and included in the document. Although not illustrated, the rendering order information of the object before the rotation process is also determined by the same method and then memorized.

In step S3005, it is judged whether the type of the object is an image or another type. If the object type is other than an image, S3006 is entered and the vector data are generated. In the case of an image, S3007 is entered and the image rotation process, such as shown in FIG. 8, is performed. At this point, because there is a possibility for both the image before rotation and the image after rotation to be used in a subsequent process (the rendering process, etc.), both images are memorized in the RAM 2002 or other memory unit.

In step S3008, the processing according to each object is ended and S3009 is entered. In step S3009, the document corresponding to the images before rotation and the document corresponding to the images after rotation are memorized in the HDD 2004 or other memory unit and the process is ended. Because the documents respectively corresponding to the images before rotation and the images after rotation are memorized, the document, among the memorized documents, that corresponds to the printing direction can be used for the printing process. Because the rotation process thus does not have to be performed according to the printing direction during the printing, the speed of the printing process in the case where the direction in which the images were scanned differs from the printing direction can be improved.

Although in the process shown in FIG. 10, the documents corresponding to both the images before rotation and the images after rotation are memorized, the present invention is not restricted to this method. For example, the document corresponding to the images after rotation (data including a first printing order information and the image data) are memorized in the memory unit. Then, in regard to the images before rotation, just the object rendering order information (second printing order information) may be memorized. Or, the document corresponding to the images before rotation may be memorized in the memory unit, and just the object rendering order information may be memorized for the images after rotation. That is, two types of order information concerning the object rendering order and one type of image data are memorized in the memory unit. By doing so, because the object rendering order does not have to be determined in performing the printing process even when the manuscript scanning direction and the printing direction differ, the speed of the printing process can be improved.

Figure 11:
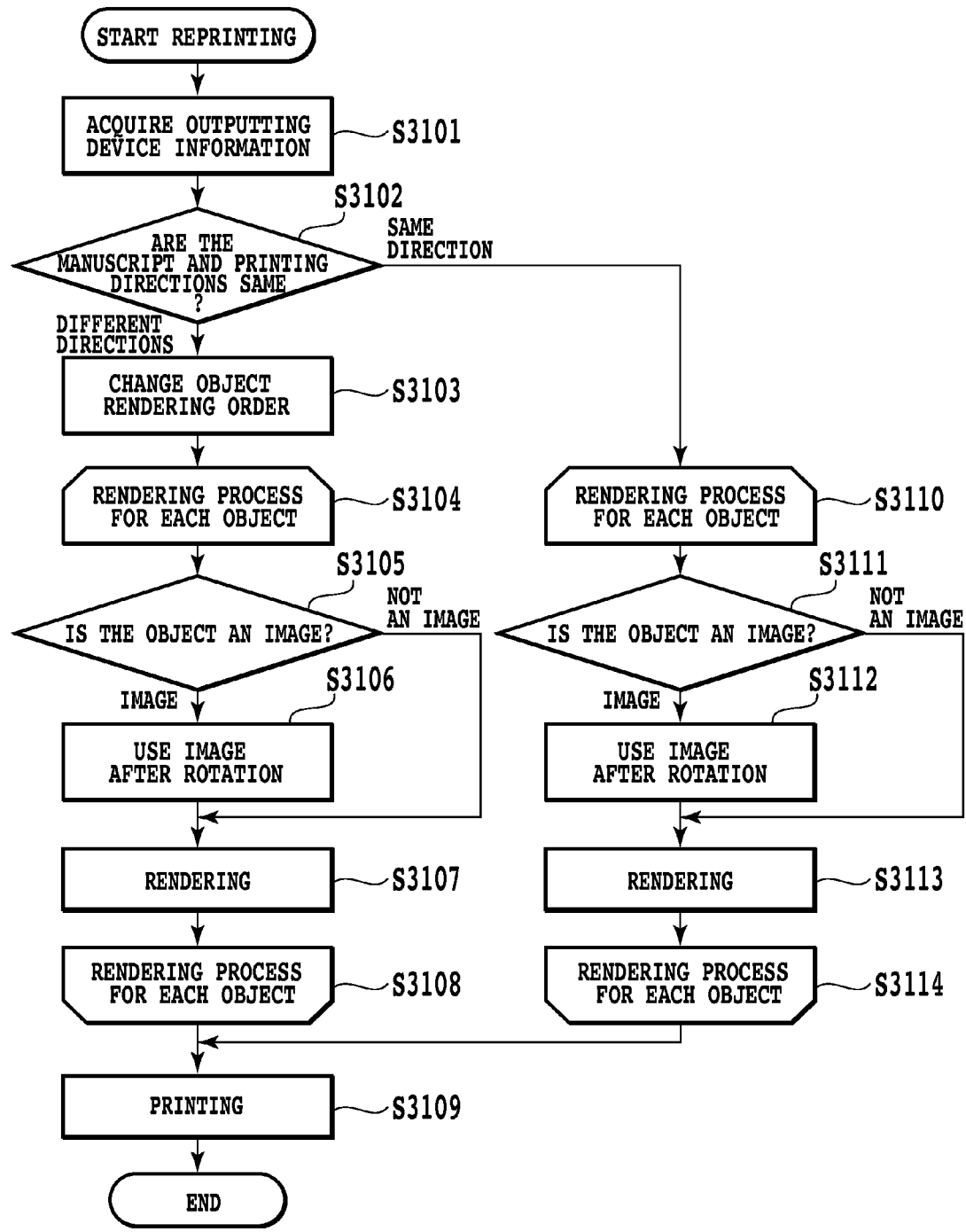
FIG. 11 is a flowchart illustrating a processing procedure for reprinting a document stored in an equipment in Embodiment 1 of the present invention.

FIG. 11 is a flowchart of a procedure for a process of reprinting a document (step S106 of FIG. 5) stored in an equipment (in the image forming apparatus) in step S105 of FIG. 5. Process control is performed by the CPU 2001, provided in the controller unit 2000, expanding a program, memorized in the HDD 2004, etc., in the RAM 2002 and executing the program.

In step S3001, the information concerning the device capabilities during printing, such as whether the direction in which the printing output can be performed is longitudinal or lateral, what types of sheets are placed in the sheet feeding stages, etc., are acquired. The direction in which output must be performed during printing is then judged according to the device capabilities. For example, in the case where the sheet conveying direction is restricted to the lateral direction as in a compact machine, the printing direction is the lateral direction. Even in the case where conveying in either direction is enabled, if there are A4-size and A4R-size sheet feeding stages and the A4R-size sheets have run out, the printing direction is set to the longitudinal direction.

In step S3102, the process is switched according to whether or not the direction of the objects in the manuscript is the same as the direction of the sheet during printing. When the directions are the same, step S3110 is entered.

In step S3110 to step S3114, the rendering process according to each object is performed on the document, which, among the documents memorized in the HDD 2004, etc., in step 3009 of FIG. 10, corresponds to the images before rotation.

In step S3111, the process is switched according to whether the type of an object is an image or another type. In the case of a type other than an image, step S3113 is entered and the rendering process is performed. In the case of an image, the image before rotation is selected in S3112 and the rendering process is performed in step S3113. In step 3114, the rendering process according to each object is ended and step S3109 is entered.

In step S3102, if the direction of the objects in the document and the direction of the sheet during printing differ, step S3103 is entered.

In steps S3103 to S3108, the rendering process is performed on the document, which among the documents memorized in the HDD 2004, corresponds to the images that have been rotated. In step S3103, the object rendering order information included in the document is acquired and this information is changed as the order in which rendering is performed in a subsequent process.

Step S3104 to step S3108 is the rendering process according to each object. In step S3105, the process is switched according to whether the type of an object is an image or another type. In the case of a type other than an image, step S3107 is entered and the rendering process is performed. In the case of an image, the image after rotation is selected in S3106 and the rendering process is performed in step S3107. In step S3108, the rendering process according to each object is ended and step S3109 is entered. In step S3109, printing of the prepared bitmap data is performed and the process is ended.

As described above, with the process shown in FIG. 11, among the documents memorized, the document corresponding to the printing direction is used for the printing process. Because the rotation process thus does not have to be performed according to the printing direction during printing, the speed of the printing process in the case where the direction in which the manuscript was scanned differs from the direction in which the images are printed can be improved.

Figure 12A:
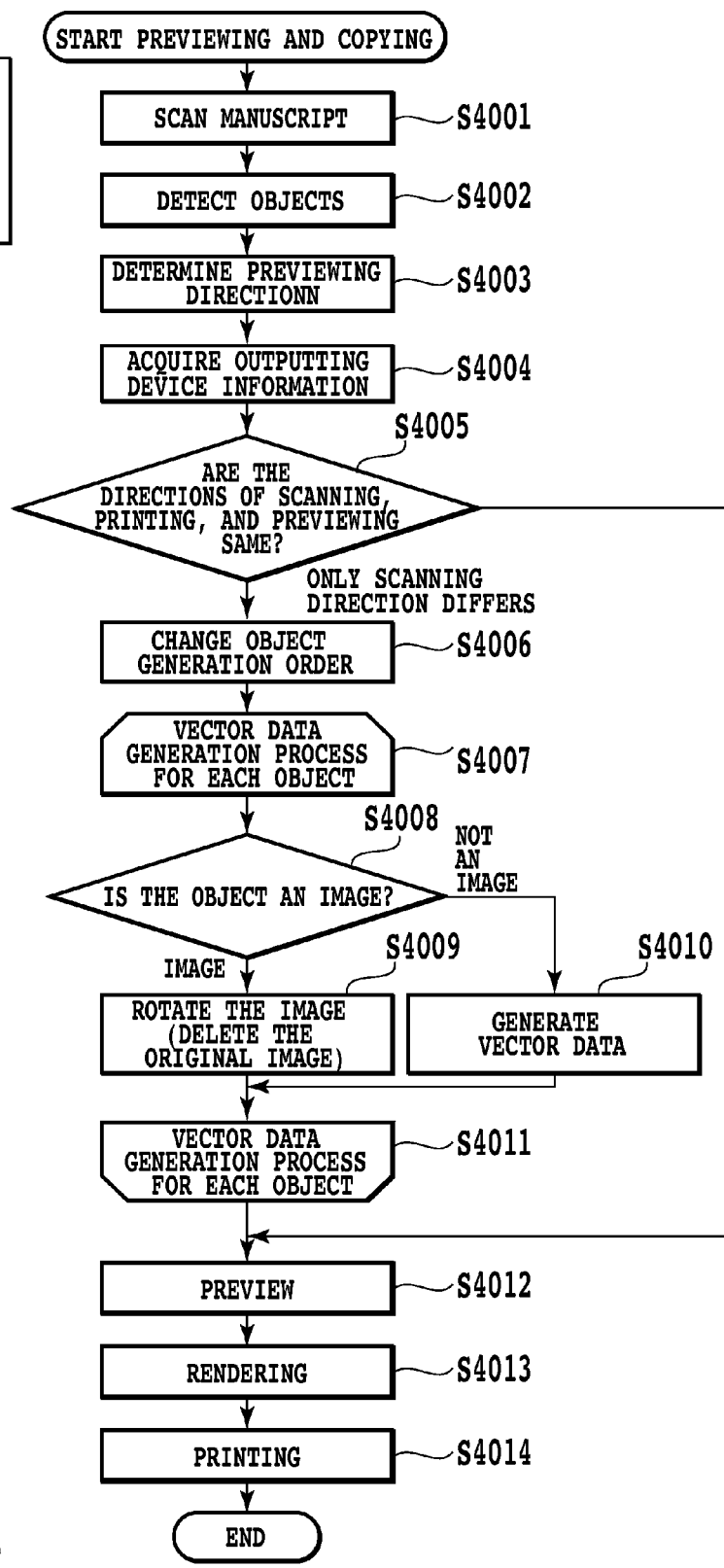
FIG. 12A illustrates a flowchart of a processing procedure for previewing and copying in Embodiment 1 of the present invention.
Figure 12B:
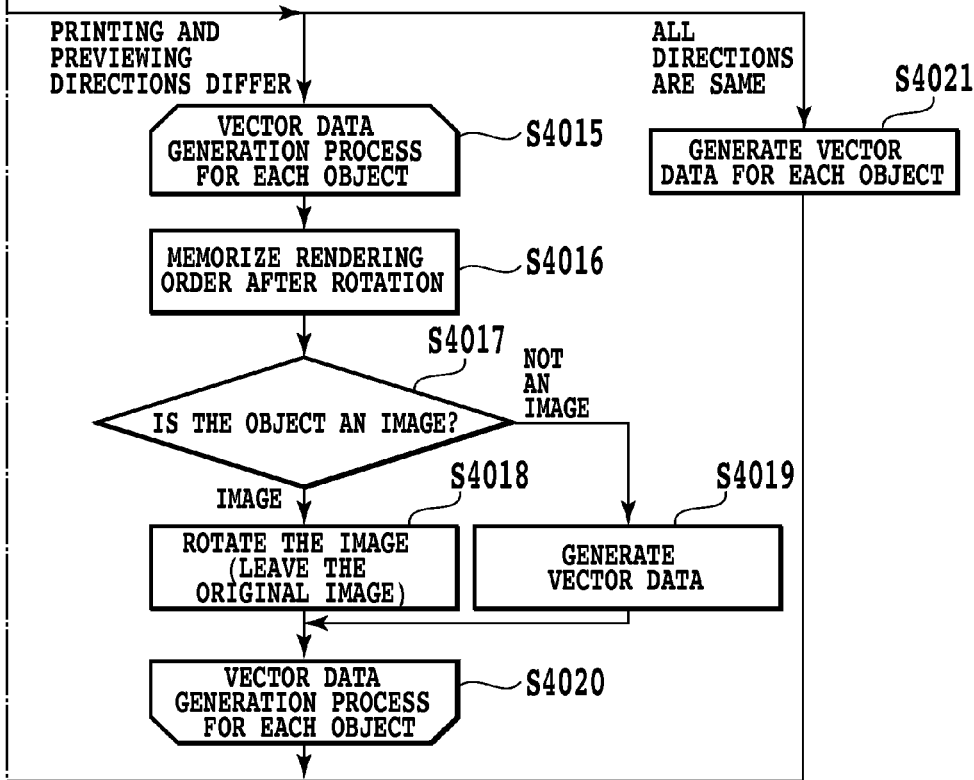
FIG. 12B illustrates a flowchart of a processing procedure for previewing and copying in Embodiment 1 of the present invention.

FIGS. 12A and 12B illustrate a flowchart of a procedure for a previewing and copying process (step S107 in FIG. 5) in the present embodiment. Process control is performed by the CPU 2001, provided in the controller unit 2000, expanding a program, memorized in the HDD 2004, etc., in the RAM 2002 and executing the program.

In step S4001, scanning of the manuscript in a certain direction is performed by the scanner unit 2070 in accordance with control by the controller unit 2000, and the image obtained by scanning is generated as the bitmap data in the controller unit 2000. That is, the image data scanned from the manuscript are input into the image forming apparatus.

In step S4002, first, objects, such as texts, images, lines, graphics, tables, etc., are detected from the bitmap generated at the controller unit 2000. The image region expressed by the bitmap is then divided according to each object detected. Further, the layout information of manuscript (the information including the position information of the objects in the manuscript) is generated.

In step S4003, a direction in which images are to be displayed during previewing is determined from the object detection results. The direction of display during previewing may be determined by any other method. Information on the determined preview display direction is memorized in the RAM 2002, HDD 2004, or other memory unit.

In step S4004, the information concerning the device capabilities during printing, such as whether the direction in which printing output can be performed is longitudinal or lateral, what types of sheets are placed in the sheet feeding stages, etc., are acquired. The direction in which output must be performed during printing is then judged according to the device capabilities. For example, in the case where the sheet conveying direction is restricted to the lateral direction as in a compact machine, the printing direction is the lateral direction. Even in the case where conveying in either direction is enabled, if there are A4-size and A4R-size sheet feeding stages and the A4R-size sheets have run out, the printing direction is set to the longitudinal direction. The printing direction judgment result is memorized as the printing direction information in the RAM 2002, HDD 2004, or other memory unit.

In step S4005, the process is switched according to whether or not the direction of the sheet during scanning, the direction of the sheet during printing, and the previewing direction are the same. If the directions of scanning, printing, and previewing are all the same, the process proceeds to step S4021 and the vector data are generated according to each object.

If the directions of printing and previewing differ, the process proceeds to the process of generating the vector data according to each object of step S4015 to step S4020. In step S4016, the object rendering order in the case of performing the rotation process is memorized in the RAM 2002, etc. In step S4017, the process is switched according to whether the object type is an image or another type. If the object type is other than an image, the process proceeds to step S4019 and the vector data of the object are generated. If the object type is an image, the process proceeds to step S4018 and the image rotation process, such as shown in FIG. 8, is performed. Here, because both the image before rotation and the image after rotation are used in a subsequent process, both images are stored. The process according to each object ends in step S4020 and the process proceeds to step S4012.

The process in the case where just the scan direction differs in step 34005 shall now be described. Here, in step S4006, the object generation order is changed as was described the using the example of FIG. 7. Step S4007 to step S4011 is a process of generating vector data according to each object. In step S4008, the process is switched according to whether the object type is an image or another type. If the object type is other than an image, the process proceeds to step S4010 and the vector data of the object are generated. If the object type is an image, the process proceeds to step S4009 and the image rotation process, such as shown in FIG. 8, is performed. Here, the image before rotation is deleted because it is not used in the printing or the previewing process. The process according to each object ends in step S4011 and the process proceeds to step S4012.

In step S4012, the previewing process is performed. At this point, if the printing and previewing directions differ, the data used for previewing are deleted. In step S4013, the rendering process is performed on the generated document. In the rendering process, resolution conversion, color processing, etc., are performed to generate bitmap data. In step S4014, printing of the prepared bitmap data is performed and the process ends.

Embodiment 2

In Embodiment 1, in memorizing the prepared document in the image forming apparatus, the vector data according to each object are memorized in the order of scanning and further, the order when rotation is performed is memorized. In performing reprinting, resorting is performed according to the order when rotation is performed and then the rendering and printing processes are performed. At this point, by reducing the time taken for the resorting process during reprinting, the reprinting process can be made even higher in speed.

In the present embodiment, in preparing the document, the document is prepared so as to hold the object data both before rotation and after rotation and the data matching the printing direction are selected during reprinting. Because the resorting process does not have to be performed during reprinting, the reprinting process can be made high in speed. A detailed processing procedure of the present embodiment shall now be described using FIGS. 13 and 14.

Figure 13:
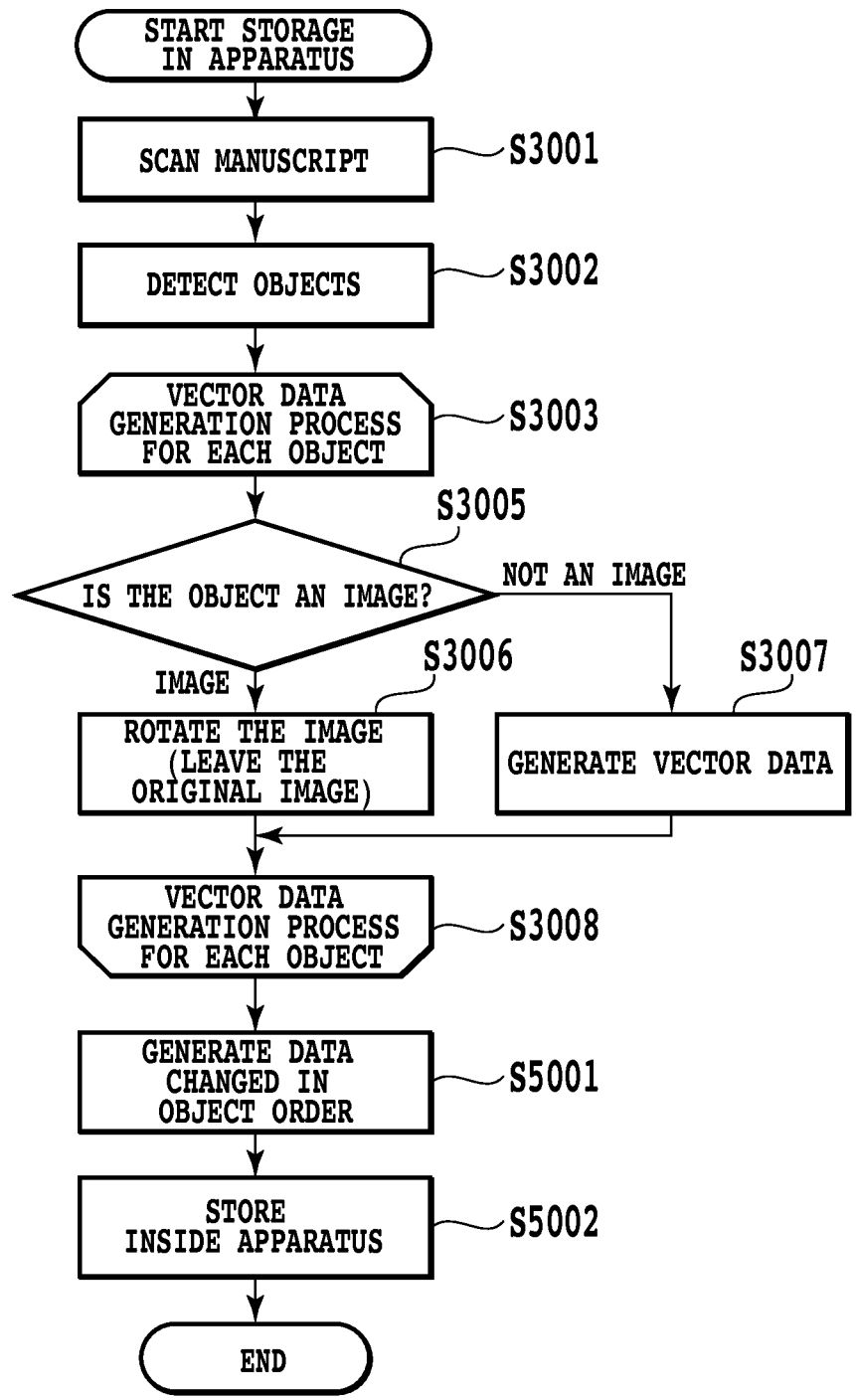
FIG. 13 is a flowchart illustrating a processing procedure for storing a document in an equipment in Embodiment 2 of the present invention.

FIG. 13 is a flowchart of a processing procedure for storing a document in an equipment in the present embodiment. Process control is performed by the CPU 2001, provided in the controller unit 2000, expanding a program, memorized in the HDD 2004, etc., in the RAM 2002 and executing the program.

Because processes that are the same as those of the processing procedure of FIG. 11 described with Embodiment 1 are performed in step S3001 to step S3003, the description thereof shall be omitted. The process of step S3004 is not performed in the present invention. Because processes that are the same as those of the processing procedure of FIG. 11 described with Embodiment 1 are performed in step S3005 to step S3008 as well, the description thereof shall be omitted.

In step S5001, data, with which the vector data generated according to each object are resorted, are prepared. In step S5002, both the vector data before the resorting of the order of the objects and the vector data after resorting are memorized in the HDD 2004.

Figure 14:
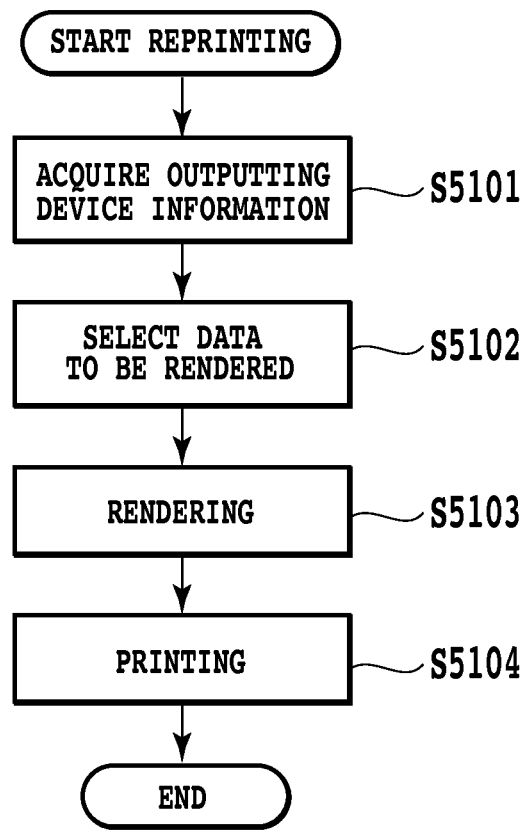
FIG. 14 is a flowchart illustrating a processing procedure for reprinting a document stored in an equipment in Embodiment 2 of the present invention.

FIG. 14 is a flowchart of a processing procedure for reprinting a document stored in an equipment in the present embodiment. Process control is performed by the CPU 2001, provided in the controller unit 2000, expanding a program, memorized in the HDD 2004, etc., in the RAM 2002 and executing the program.

In step S5101, the device capabilities during printing, such as whether the direction in which output can be performed is longitudinal or lateral, what type of sheets are placed in the sheet feeding stages, etc., are acquired. The direction in which output must be performed during printing is then judged according to the device capabilities. For example, when the sheet conveying direction is restricted to the lateral direction as in a case where the remote device is a compact machine, the printing direction is the lateral direction. Even in the case where conveying in either direction is enabled, if there are A4-size and A4R-size sheet feeding stages and the A4R-size sheets have run out, the printing direction is set to the longitudinal direction.

In step S5102, data to be rendered are selected from among the objects according to the printing direction. In step S5103, the rendering process is performed on the selected vector data. In the rendering process, resolution conversion, color processing, etc., are performed to generate bitmap data. In step S5104, printing of the prepared bitmap data is performed and the process ends.

Although with the present embodiment, only the case of storage in the image forming apparatus is described, the data before rotation and after rotation may obviously be held simultaneously in the procedures of previewing, copying, etc., as well.

As described above, according to the present embodiment, because there is no need to determine the object rendering order in performing the printing process, even when the manuscript scanning direction and the printing direction differ, the speed of the printing process can be improved.

Embodiment 3

In Embodiments 1 and 2, in the case where the document is stored in the image forming apparatus, the data before rotation and after rotation are constantly held at the same time in regard to the data inside the document. However, in a case where usage after storage is limited, it is redundant to hold both sets of data and one of the sets of data can be deleted. For example, both sets of data are held in a case where both A4 and A4R sheets exist in the paper feeding stages, and the data for printing in the lateral direction are deleted when the A4R sheets in a paper feeding stage are replaced by A3 sheets. In the present embodiment, by deleting data in such a case where usage is restricted as described above, the amount of data held can be reduced.

Embodiment 4

Although various embodiments were described above, the present invention may be applied to a system configured from a plurality of equipment as well as to an apparatus made up of a single equipment. Examples include scanners, printers, PCs, copiers, MFPs, and facsimile apparatuses.

The present invention can also be put into practice by supplying a software program, which realizes the above-described functions of the embodiments, directly or from a remote location to a system or an apparatus and by a computer, included in the system, etc., reading and executing the program codes.

The present invention is thus also put into practice by program codes per se that are installed in a computer to realize the functions and processes of the present invention. That is, a computer program for realizing the functions and processes is, in itself, an aspect of the present invention.

In this case, as long as the functions of the program are provided, the program may be of any form, such as objects codes, a program executed by an interpreter, script data supplied to an OS, etc.

A memory medium for supplying the program may, for example, be a flexible disk, a hard disk, an optical disk, a magneto-optical disk, an MO, a CD-ROM, a CD-R, a CD-RW, etc. The memory medium may also be a magnetic tape, a non-volatile memory card, a ROM, a DVD (DVD-ROM, DVD-R), etc.

Further, the program may be downloaded from an internet/intranet website using a browser of a client computer. That is, the computer program of the present invention per se or a compressed file with an automatic installation function may be downloaded from the website into a hard disk or other memory medium. The present invention can also be put into practice by dividing program codes making up the program of the present invention into a plurality of files and downloading the respective files from different websites. That is, a WWW server that allows a plurality of users to download program files for realizing by a computer the functions and processes of the present invention may also be a component of the present invention.

Furthermore, the program of the present invention may be encrypted, stored in a CD-ROM or other memory medium, and then distributed to users. In this case, just users meeting predetermined conditions may be allowed to download decryption key information from websites via the internet/intranet to decrypt the encrypted program using the key information and install the program in a computer.

Further, the functions of an above-described embodiment may be realized by a computer executing a program that has been read. An OS operating on the computer may perform all or a portion of the actual processes based on instructions of the program. Obviously, the functions of the embodiments can be realized in this case as well.

Furthermore, a program read from a memory medium may be written into a memory provided in a function extension board inserted in a computer or a function extension unit connected to the computer. A CPU provided in the function extension board or function extension unit may perform all or a portion of the actual processes based on instructions of the program. The functions of the embodiments can be realized in such a manner as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-174704, filed Jul. 3, 2008, which is hereby incorporated by reference herein in its entirety.

What is claimed is:

1. An image forming apparatus comprising:
   a unit for inputting image data acquired by scanning an original image;
   a unit for dividing the input image data into a plurality of objects including at least an image object and other objects;
   a unit for judging a printing direction for printing the input image data;
   a unit for determining first order information which indicates a rendering order of the image object and the other objects in the case where the input image data is rotated, and second order information which indicates a rendering order of the image object and the other objects in the case where the input image data is not rotated;
   a unit for rotating the image object;
   a unit for generating vector data of the other objects; and
   a memory unit for storing the first order information, the second order information, the image object which is rotated, the image object which is not rotated, and the vector data of the other objects.

2. The image forming apparatus according to claim 1, wherein the other objects include a text object and a graphic object, and
   wherein the text object and the graphic object are vectorized without rotating.

3. An image forming method for an image forming apparatus comprising:
   a step of inputting image data acquired by scanning an original image;
   a step of dividing the input image data into a plurality of objects including at least an image object and other objects;
   a step of judging a printing direction for printing the input image data;
   a step of determining first order information which indicates a rendering order of the image object and the other objects in the case where the input image data is rotated, and second order information which indicates a rendering order of the image object and other objects in the case where the input image data is not rotated;
   a step of rotating the image object;
   a step of generating vector data of the other objects; and
   a memorizing step of storing the first order information, the second order information, the image object which is rotated, the image object which is not rotated, and the vector data of the other objects.

4. A non-transitory computer-readable recording medium storing a computer-executable program for causing a computer to perform the image forming method according to claim 3.

* * * * *